Oct. 19, 1926.
W. DUBILIER
1,603,939
CONDENSER CONSTRUCTION
Filed Jan. 21, 1921
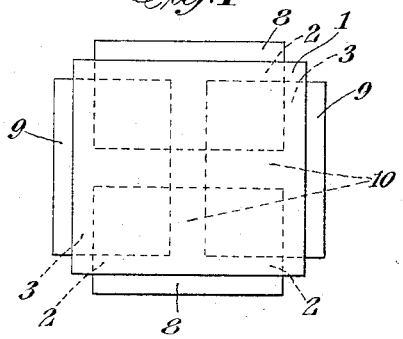
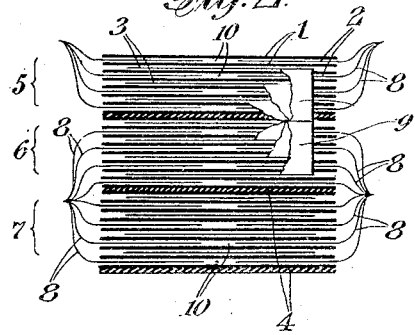 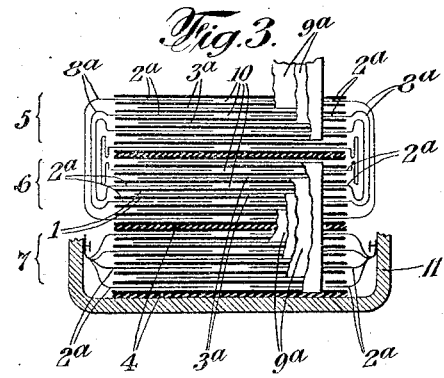
William Dubilier  Inventor
By his Attorneys
Pringle Knight & Small Patented Oct. 19, 1926.

1,603,939

UNITED STATES PATENT OFFICE.

WILLIAM DUBILIER, OF NEW YORK, N. Y., ASSIGNOR TO DUBILIER CONDENSER & RADIO CORPORATION, A CORPORATION OF DELAWARE.

CONDENSER CONSTRUCTION.

Application filed January 21, 1921. Serial No. 438,942.

The invention has for an object to provide an electrical condenser adapted to withstand high potentials or heavy currents, wherein a relatively large amount of heat conductivity is afforded outwardly from the interior of the condenser, and to obtain such heat conductivity in a manner which will minimize the occurrence of eddy currents in the conducting plates.

Another object of the invention is to so construct the conductive plates of condensers as to facilitate the building up of a stack consisting of a number of sections in series.

Further objects and advantages of the invention will be in part obvious and in part specifically pointed out in the description hereinafter contained which, taken in connection with the accompanying drawings, discloses certain embodiments of the invention; such embodiments, however, are to be considered merely as illustrative of its principle. In the drawings:

Fig. 1 is a top view of a condenser stack made in accordance with the invention.

Fig. 2 is a side view of the same, certain portions being cut away.

Fig. 3 is a view similar to Fig. 2, but showing a modified construction of condenser plates.

The invention is disclosed as applied to condenser sections or a stack made up of a plurality of sections, each consisting of rectangular dielectric sheets 1, for example, of mica, interleaved with groups of conducting plates or elements 2 and 3 of opposite polarity, which will ordinarily be made of soft metal, such as tin foil. As shown in Figs. 2 and 3 a plurality of condenser sections of the character above described may be connected in series to form a condenser adapted to withstand high potentials, insulating separator plates 4 being interposed between the several sections 5, 6 and 7 of the condenser, if desired. Where a condenser of the above character is to withstand high potentials or heavy currents, the unavoidable losses within the interior of the stack produce a relatively large amount of heat which will cause a progressive deterioration of the condenser unless means is provided for dissipating the heat at a rate commensurate with its production.

In order to afford ample heat conduction from the interior of the stack outwardly, the conducting plates of a condenser section such as the group of plates 2 are provided with terminals 8 on two sides of the stack, the terminals being formed in the present instance merely by extending the conducting plates beyond the edges of the dielectric sheets 1. Thus, the metal which makes up the conducting plates 2 affords a path of high heat conductivity outwardly in two directions from the interior of the stack so that heat may be readily conducted away. Preferably the group of conducting plates 3 are also provided with terminal projections 9 extending beyond the remaining edges of the dielectric sheets with the result that paths of high heat conductivity are afforded from the interior of the stack outwardly in all four directions.

A number of sections such as above described may be connected in series, for example, in the manner shown in Fig. 2, by connecting the terminals 8 of section 6 to the similar terminals 8 of section 7 next beneath, and connecting the terminals 9 of section 6 to the similar terminals of the section 5 next above. Thus, ample heat conductivity will be provided for all parts of such a series condenser.

In accordance with this invention, the groups of conducting plates which have terminals on two sides of the stack are each subdivided into halves or other portions spaced apart to provide gaps 10, with the result that although the several portions of each group of plates are at the same potential, such plates do not form a complete electric circuit. Thus, when a condenser section is placed in circuit by connecting its terminals 8, for example, to the similar terminals 8 of an adjacent section, all conducting plates of each group in that section having those terminals are at the same potential, and yet the gap or gaps 10 will prevent a complete electric loop from being formed. If conducting plates of ordinary character were employed, omitting the gaps 10, and extending continuously through the condenser, and connected to the similar plates of an adjacent section on two sides of the stack, a complete electric loop would be formed which would tend to the formation of much heat and would offset any benefits which otherwise might be obtained from the additional heat conductivity from the interior of the stack. By the use of conducting plates with gaps of the character above described, however, the avoidance of such trouble is attained. It will be understood that although gaps 10 are illustrated as located midway between the terminals of the conducting plates, the exact location of these gaps is not essential.

According to Fig. 2, the connections between adjacent sections are shown as made by joining the adjacent projecting terminals 8 of the conducting plates, for example, by soldering, but in Fig. 3 there is disclosed a structure of plate whereby the necessity of so making terminal connections between adjacent sections is avoided, and yet gaps are provided which prevent the formation of complete electric loops. Referring to Fig. 3, the group of plates 2ª of the upper section 5 are sub-divided into portions spaced apart to provide gaps 10, and the free ends 8ª of such group are extended beyond different sides of the stack, and folded to interleave with the dielectric sheets 1 of the section 6 next beneath, to form a group of conducting plates 2ª for the section 6 which are integral with the group of similar plates of section 5. As shown, the group of plates 2ª of the section 6 are spaced apart at their inner ends to provide gaps 10, although it will be understood that this is not essential so long as the gaps are provided in the group of plates 2ª of section 5. In a similar manner the group of plates 3ª of section 5 have their free ends 9ª extended beyond the sides of the stack and folded upwardly to interleave with dielectric sheets of the section next above, while the free ends 9ª of the group of plates 3ª in section 6 are extended beyond the sides of the stack and folded downwardly to interleave with dielectric sheets of section 7, thus making the groups of plates 3ª in sections 6 and 7 integral. It will be understood that the group of plates 3ª of the various sections are provided with one or more gaps at suitable points to prevent complete electric loops from being formed by them. In Fig. 3 the group of plates 2ª of section 7 are shown as connected to suitable conducting elements such as the portion of a metallic casing 11 for the condenser to connect the condenser in circuit.

With a construction of the character shown in Fig. 3 the connections between the sections are made when the stack is built up, and if the mica sheets be carefully gauged for thickness and tested for electrical qualities before the stack is built up, it is possible to build up the complete condenser, impregnate it with suitable insulating compound, and compress it to exclude air or foreign matter from the interior of the stack without requiring that the sections be taken apart and adjusted or tested after the stack has once been built.

While certain specific embodiments of the invention have been described, it is obvious that many changes may be made therein without departing from the principle of the invention as defined in the following claims.

I claim:

1. A condenser comprising a plurality of condenser sections assembled into a stack, each of said sections having interleaved dielectric sheets and groups of conducting plates of opposite polarity and each of said groups of conducting plates having terminals on two sides of the stack, the terminals of one group in a given section being respectively connected to the terminals of a group in the section next above and the terminals of the other group of such section being respectively connected to the terminals of a group in the section next beneath, to connect the sections in series, and the plates of at least one group of connected groups of plates, being provided with gaps inside the condenser.

2. A condenser comprising a plurality of condenser sections assembled into a stack, each of said sections comprising dielectric sheets interleaved with groups of conducting plates of opposite polarity, each group of opposite polarity extending beyond different opposite sides of said stack to afford two terminals for each of said groups, said groups being disposed at right angles to each other so as to afford heat conduction outwardly from the interior of the condenser, the terminals of one group in a given section being respectively connected to the corresponding terminals of the section next above, and the terminals of the other group of such section being respectively connected to the corresponding terminals in the section next beneath, to connect the sections in series, and the plates of at least one group of plates being provided with transverse gaps inside the condenser.

3. A condenser comprising a plurality of condenser sections assembled into a stack, one of said sections having dielectric sheets interleaved with groups of conducting plates of opposite polarity, the plates of one of said groups being folded over at both ends to interleave with dielectric sheets of an adjacent section to form a group of similar conducting plates for said last-mentioned section integral with the plates of the first-mentioned section, gaps being provided in at least one of the group of conducting plates on the interior of the condenser.

4. A condenser comprising a plurality of condenser sections assembled into a stack, one of said sections having dielectric sheets interleaved with groups of conducting plates of opposite polarity, and one of said groups of conducting plates being subdivided into portions spaced apart to provide gaps in the interior of the stack, said portions extending beyond opposite sides of the stack and each being folded to interleave with dielectric sheets of an adjacent section to form conducting plates for said last-mentioned section integral with plates of said first-mentioned section, the folded ends of said plates being spaced apart to provide gaps in the interior of said second-mentioned section.

5. A condenser comprising a plurality of condenser sections assembled into a stack, each of said sections having dielectric sheets interleaved with groups of conducting plates of opposite polarity, the groups of plates of one of said sections being transverse to each other, and the free ends of the plates of each group being extended beyond the sides of the stack to afford heat conduction outwardly from the interior of the stack on all sides thereof, each of said groups of plates being subdivided into portions spaced apart to provide gaps in the interior of the stack, the free ends of one of said groups being folded to interleave with dielectric sheets of the section next above to form conducting plates for said last-mentioned section integral with plates of said first-mentioned section, and the free ends of the other group of conducting plates being folded to interleave with dielectric sheets of the section next beneath.

6. A condenser comprising a plurality of condenser sections assembled into a stack, each of said sections having dielectric sheets interleaved with groups of conducting plates of opposite polarity, the groups of plates of one of said sections being transverse to each other, and the free ends of the plates of each group being extended beyond the sides of the stack to afford heat conduction outwardly from the interior of the stack on all sides thereof, each of said groups of plates being subdivided into portions spaced apart to provide gaps in the interior of the stack, the free ends of one of said groups being folded to interleave with dielectric sheets of the section next above to form conducting plates for said last-mentioned section integral with plates of said first-mentioned section, and the free ends of the other group of conducting plates being folded to interleave with dielectric sheets of the section next beneath, the folded ends of said conducting plates being also spaced apart to provide gaps in the plates of the sections above and beneath said first-mentioned section.

In testimony that I claim the foregoing, I have hereunto set my hand this 4th day of January, 1921.

WILLIAM DUBILIER.